United States Patent Office 3,318,863
Patented May 9, 1967

3,318,863
CATALYST AND CATALYTIC PROCESS
Omar O. Juveland, South Holland, Ill., assignor to Standard Oil Company, Chicago, Ill., a corporation of Indiana
No Drawing. Filed June 28, 1962, Ser. No. 205,852
13 Claims. (Cl. 260—94.9)

This invention relates to novel polymerization catalysts, polymerization processes and the polymer products therefrom. More specifically, this invention relates to novel cataysts and processes suitable for the preparation of particularly useful polymer products, which products have physical properties heretofore unobtainable in the product of a single polymerization reaction over a polymerization catalyst containing a transition metal oxide.

The polymerization of ethylenically unsaturated hydrocarbons by means of a catalyst containing a Group 6a transition metal oxide (according to the periodic classification of the elements presented in Moeller, "Inorganic Chemistry," p. 122, John Wiley & Sons, Inc., 1952) such as an oxide of chromium, molybdenum or tungsten, has been disclosed heretofore, as in U.S. Patent 2,726,234 to E. Field et al. The transition metal oxides are extended upon difficultly reducible support materials, for example, the difficultly reducible metallic oxides. Various known promoters are used with such catalysts, the metals and metal hydrides of Groups 1 and 2 of the periodic classification of the elements being exemplary. Similarly, polymerization of ethylenically unsaturated hydrocarbons has been accomplished with Group 5a transition metal oxides extended upon difficultly reducible supports and in the presence of suitable promoters, as in U.S. 2,773,053 to E. Field et al.

These known transition metal oxide catalyst systems are effective for the production of high molecular weight, normally solid, resinous polymers from gaseous olefins such as ethylene. The polymers can be extruded, mechanically milled, filmed or cast or treated in other ways to produce wrappings, containers and other useful items.

The characteristics of flow of a molten polymer, upon which depends the ease with which it is processed, depend upon a number of factors, among which are the molecular weight and the molecular weight distribution of the polymer. The molecular weight distribution affects the swelling ratio of a polymer, swelling ratio being the ratio between the diameter of extruded polymer and the diameter of the extrusion die. Of two polymers with similar chemical compositions, the polymer having the relatively greater swelling ratio seems generally to be more easily utilized in the manufacture of blow-molded and injection-molded articles free of imperfections such as surface ripples, fish-eyes, etc. The polymer of relatively greater swelling ratio is also in general a more elastic material than that of lower swelling ratio. The swelling ratio of polymers made with the Groups 5a and 6a transition metal oxide catalysts described above may be improved by incorporating into such polymers a second polymer which contains as a minor component some polymer of a very high degree of polymerization, that is a polymer with a molecular weight in the range of about 100,000 to about 2,000,000, or more. It is not so convenient to attempt to introduce a small amount of a high molecular weight material by itself because of the difficulty of homogeneously incorporating this in the polymer of lower molecular weight. Hence, by the usual procedures polymer containing a high molecular weight component, called the "high molecular weight tail," is incorporated into polymer which does not contain this component by mechanical milling, melt blending, or blending in a common solvent. It is apparent that in order to obtain a polymer with a desirably high swelling ratio, it may be necessary to make two different polymers in separate reactions and then undertake a blending operation. The advantage in obtaining a polymer with a desired swelling ratio in one polymerization is obvious.

I have discovered that a polymer of desirably high swelling ratio can be produced through the polymerization of ethylenically unsaturated hydrocarbons over a combination catalyst consisting of at least two different partially reduced transition metal oxides upon the same or different difficultly reducible supports. That is, the transition metal oxides may be together upon one support material; they may be separate upon two support materials, the support materials being chemically and physically the same; or they may be separate upon support materials which differ from each other chemically and/or physically. In general, a higher degree of polymerization is obtained with transition metal oxides which are to the left of a Period and down in the Group in the Periodic Table. By this I mean that polymer molecular weight tends to increase according to the following order of transition metal oxide catalysts: $TiO_2 > V_2O_5 > CrO_3$ and $HfO_2 > ZrO_2 > TiO_2$ and $Ta_2O_5 > Nb_2O_5 > V_2O_5$ and $$WO_3 > MoO_3 > CrO_3$$

By the use of appropriate combinations of these catalysts in partially reduced valence states, extended together or separately upon difficultly reducible supports, polymer products with various molecular weight ranges and chosen flow properties can be prepared. The use of more than one transition metal oxide in the same catalyst has been disclosed in U.S. Patent 2,692,258 to A. K. Roebuck et al. This disclosure differs from my invention, however, in that a Group 4a oxide is used as the support for a subhexavalent molybdena. The supporting oxide is not reduced in the catalyst preparation and hence cannot itself be active as a catalyst. An essential feature of my invention is that all the transition metal oxides in the catalyst must be at least partially reduced so that each functions as an active catalyst and produces the desired combination polymer product.

Transistion metal oxides of Groups 5a and 6a can be reduced with such agents as hydrogen, carbon monoxide, mixtures of hydrogen and carbon monoxide (such as water gas), sulfur dioxide, hydrogen sulfide, dehydrogenatable hydrocarbons, etc. Hydrogen can be employed as a reducing agent at temperatures between about 250° C. and about 850° C. although it is more often employed at temperatures within the range of 450° C. to 650° C. The hydrogen partial pressure in the reducing operation may be varied from subatmospheric pressures, e.g., 0.1 p.s.i. (absolute) to relatively high pressures up to 3000 p.s.i.g. or more; the simplest reducing operation may be effected with hydrogen at about atmospheric pressure. However, the above-listed reducing agents are not effective under ordinary conditions of use when applied to the Group 4a transition metal oxides, and I have found it preferably to use exceptionally powerful reducing agents to effect a partial reduction of these oxides to a catalytically active state. Particularly effective reducing agents are the metal alkyls, such as the aluminum and boron trihydrocarbon compounds, or dihydrocarbon hydrides.

The supporting materials for the combined catalytic transition metal oxides are suitably those materials more difficult to reduce than the transition metal oxides. These are such compounds as the difficulty reducibble metallic oxides, for example, alumina, magnesia, silica, silica-alumina and various other composites and mixtures of such compounds. Generally, the support material should have a surface area within the range of from about 1 to about 1500 m.$^2$/g. However, in some cases, it may be desirable to employ a relatively low surface area support, of which a variety are known in the art, including tabular alumina, various fused silicates, etc.

The transition metal oxides can be extended upon the support in any known manner, for example, by impregnation, co-precipitation, co-gelling and/or absorption techniques well known in the catalyst art. Additionally, finely divided transition metal oxides and supports can be dry-mixed according to techniques taught in application for U.S. patent, Ser. No. 197,911, now abandoned. The transition metal oxides themselves need not be used to make the catalysts of my invention. The catalysts may be made with any compounds of transition metals which will yield the desired oxides upon calcination. Examples of transition metal compounds which may be used to produce the catalysts of my invention are: halides; oxyhalides; oxalates; carbonyls; organo-chelates; organo-metallic compounds; etc.

The transition metal oxide catalysts are preferably used in substantially anhydrous form, i.e., they are substantially free of occluded water molecules or hydroxyl groups bound to the surface of the transition metal oxides or their supports. Substantial dehydration can be effected by known methods such as calcining the supported transition metal oxides to an elevated temperature in the range of about 100° C. to about 1200° C. in oxygen, air or oxygen-containing gases, for from about 15 minutes to about 24 hours prior to use. When a transition metal compound other than an oxide has been used in the catalyst preparation, this calcining treatment will generally convert it to the desired oxide.

In order to produce a catalyst having the desired catalytic activity of my invention, the transition metal oxides from the calcining treatment should be partially reduced prior to use. As I have disclosed hereinabove, relatively mild reducing agents can be used if the only transition metal oxides in a catalyst are oxides of Groups 5a or 6a metals; however, if a transition metal oxide of Group 4a is employed, relatively stronger reducing agents are preferable.

Various promoters known to the polymerization art may be used with my partially-reduced combination transition metal oxide catalysts. These promoters are such as the Group 1 and 2 metals and metal hydrides but are not restricted thereto. The promoter can be added to the catalyst either before or after the catalyst is contacted with the polymerizable ethylenically-unsaturated hydrocarbon charge.

I have found my invention to be particularly useful for the production of solid polymers of ethylene with desirably high swelling ratios, but other charge stocks may also be used. Illustrative of these are 1-olefins such as propylene, butene-1, 3-methylbutene-1, 4-methylpentene-1 and substituted 1-olefins; styrene and substituted styrenes; diolefins such as butadiene and isoprene, etc.

The polymerization reactions performed with my improved combination catalysts are effected under reaction conditions similar to those used for polymerization with transition metal oxide catalysts alone, such conditions being well known to the polymerization art. That is to say, polymerization can be effected at a temperature within the range of from about 0° C. to about 300° C., preferably from about 50° C. to about 275° C., and at a pressure within the range of from about 50 to about 5000 p.s.i.g., preferably from about 50 to about 1000 p.s.i.g.

The following is illustrative of the practice of my invention:

This procedure specifically illustrates the preparation of a catalytically active Group 4a catalyst.

A Group 4a metal oxide catalyst was prepared by charging 50 ml. of n-pentane, 17.7 g. of tetrabutyl titanate and 60 g. of alumina into a 1-liter flask; the flask contents were agitated and the n-pentane removed under vacuum; the dried catalyst was calcined at 450° C. with oxygen for 0.5 hour. A 10.0 g. sample of this titania-alumina catalyst was placed in a 100 ml. round bottom flask under a nitrogen atmosphere. To it was added 1.76 g. of aluminum triethyl in 9 ml. n-heptane. The white titania-alumina catalyst turned gray-black and after removal of the n-heptane and the excess aluminum alkyl with a Rinco evaporator, a gray solid was recovered.

This titania-alumina catalyst is itself effective for polymerization with the promoters heretofore described. To illustrate, ethylene was added to a 1-gallon reactor containing two liters of odorless mineral spirits solvent and the reactor was brought to 268° C. A portion of the titania-alumina catalyst was introduced to the reactor with sodium promoter and the ethylene pressure was increased to 700 p.s.i. After 2.75 hours there was recovered 75 g. of a solid polyethylene which had an intrinsic viscosity of 2.3 dl./g.

The following procedure illustrates the use of the combination catalyst of my invention:

Two liters of odorless mineral spirits were placed in a 1-gallon stirred reactor. The reactor contents were heated to 268° C. and ethylene was added to bring the pressure to 300 p.s.i. A combination catalyst consisting of 2.0 g. of an 8% titania-on-alumina (pre-reduced with aluminum triethyl as described above) and 4.5 g. of a 10% molybdena-on-alumina (hydrogen-reduced) was introduced with 0.75 g. of sodium promoter (as a dispersion in odorless mineral spirits). After 3.75 hours there was recovered 175 g. of solid polyethylene.

A portion of the polymer product was dissolved in odorless mineral spirits, filtered to remove catalysts, precipitated with acetone, washed with acetone and extracted with n-pentane. This was stabilized with 0.15 weight percent of Santonox R and dried. This polymer had an intrinsic viscosity of 2.0 dl./g. and a swelling ratio of 2.1 (swelling ratio is defined as the ratio of the diameter of extruded polymer to the diameter of the dye in a blow-molding operation).

A polyethylene prepared under similar conditions with a sodium-promoted molybdena-alumina catalyst alone had an intrinsic viscosity of 2.0 dl./g. and a swelling ratio of 1.8–1.9.

The difference in swelling ratios indicates that the catalyst and process of my invention provide a polymer heretofore unobtainable as the product from a single polymerization reaction over a polymerization catalyst containing a transition metal oxide.

Having thus described my invention, what I claim is:

1. A catalyst for the polymerization of ethylenically unsaturated hydrocarbons consisting essentially of a first partially-reduced transition metal oxide on a difficultly reducible support and a second partially-reduced transition metal oxide on a difficultly reducible support, and a promoter selected from the group consisting of metals and metal hydrides of Groups 1 and 2 of the periodic classification, said first and said second partially-reduced transition metal oxides being different partially-reduced transition metal oxides which produce a relatively higher and a relatively lower molecular weight polymer when used for polymerization.

2. The catalyst of claim 1 in which each difficultly reducible support is a difficultly reducible metallic oxide.

3. The catalyst of claim 2 in which each difficultly reducible support is alumina.

4. The catalyst of claim 3 in which said first partially-reduced transition metal oxide is molybdena and said second partially-reduced transition metal oxide is titania and said promoter is sodium.

5. A process for polymerizing an ethylenically unsaturated hydrocarbon which comprises contacting an ethylenically unsaturated hydrocarbon under polymerizing conditions of temperature and pressure with a catalyst consisting essentially of a first partially-reduced transition metal oxide on a difficultly reducible support and a second partially-reduced transition metal oxide on a difficultly reducible support, and a promoter selected from the group consisting of metals and metal hydrides of Groups 1 and 2 of the periodic classification, said first and said second partially-reduced transition metal oxides being different partially-reduced transition metal oxides which produce a relatively higher and a relatively lower molecular weight polymer when used for polymerization.

6. The process of claim 5 wherein the ethylenically unsaturated hydrocarbon is a 1-olefin.

7. The process of claim 6 wherein each difficultly reducible support is a difficultly reducible metallic oxide.

8. The process of claim 7 wherein each difficultly reducible support is alumina.

9. The process of claim 8 wherein said first partially-reduced transition metal oxide is molybdena and said second partially-reduced transition metal oxide is titania.

10. The process of claim 9 wherein said 1-olefin is ethylene.

11. The process of claim 10 wherein the temperature is from about 0° C. to about 300° C. and the pressure is from about 50 to about 1000 p.s.i.g.

12. A process for polymerizing an ethylenically unsaturated hydrocarbon which comprises contacting an ethylenically unsaturated hydrocarbon under polymerizing conditions of temperature and pressure with a catalyst consisting essentially of a first partially-reduced transition metal oxide on a difficultly reducible support and a second partially-reduced transition metal oxide on a difficultly reducible support, and a sodium promoter, said first and said second partially-reduced transition metal oxides being different partially-reduced transition metal oxides, whereby a solid polymeric product is produced which has a swelling ratio different from that obtainable by polymerizing the ethylenically unsaturated hydrocarbon over a single partially-reduced transition metal oxide on a difficultly reducible support.

13. A process for polymerizing ethylene which comprises contacting ethylene at a temperature of from about 0° C. to about 300° C. and a pressure of from about 50 to about 1000 p.s.i.g. with a combination catalyst consisting essentially of a partially reduced molybdena on alumina and a partially reduced titania on alumina and a sodium promoter, said molybdena being reduced with hydrogen and said titania being reduced with an aluminum trialkyl prior to combination, whereby solid polyethylene is produced which has a swelling ratio of about 2.1.

References Cited by the Examiner

UNITED STATES PATENTS

| | | | |
|---|---|---|---|
| 2,691,647 | 10/1954 | Field et al. | 260—94.9 |
| 2,824,089 | 2/1958 | Peters et al. | 260—94.9 |
| 2,912,421 | 11/1959 | Juveland et al. | 260—94.9 |

JOSEPH L. SCHOFER, *Primary Examiner.*

F. L. DENSON, *Assistant Examiner.*